Figure 3:
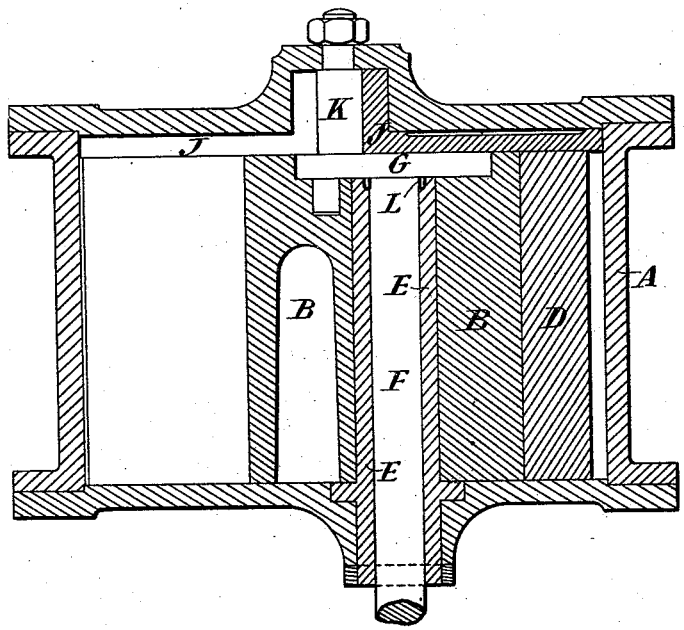

(No Model.) 2 Sheets—Sheet 1.
H. SKINNER.
BLOWER, PUMP, ENGINE, AND METER.
No. 423,497. Patented Mar. 18, 1890.
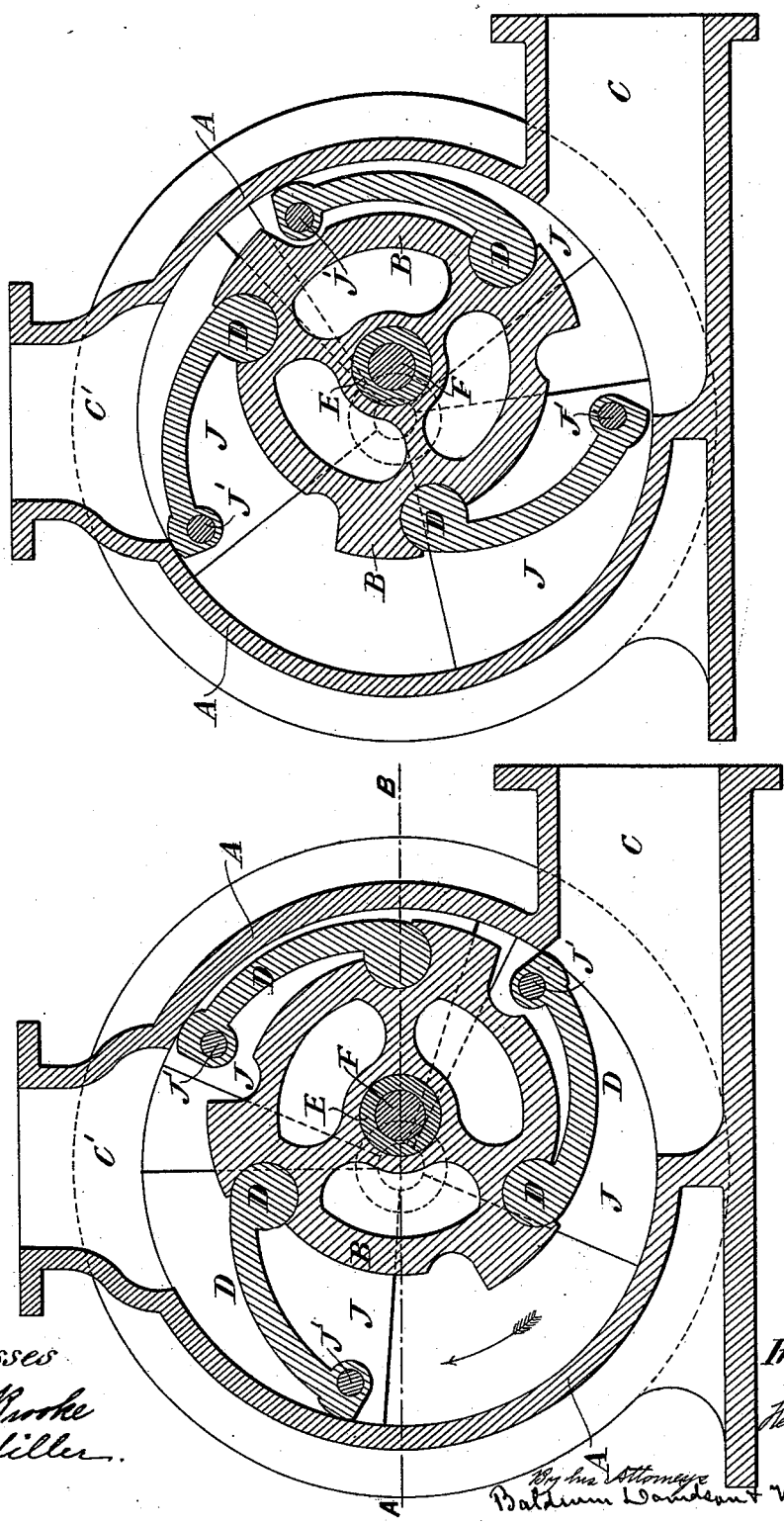
Witnesses
C. W. Burke
B. Miller
Inventor
Henry Skinner
By his Attorneys
Baldwin Davidson + Wight (No Model.) 2 Sheets—Sheet 2.

H. SKINNER.
BLOWER, PUMP, ENGINE, AND METER.

No. 423,497. Patented Mar. 18, 1890.

Witnesses
L. M. Brooke,
B. Miller.

Inventor
Henry Skinner
By his Attorneys,
Baldwin Davidson & Wight.

UNITED STATES PATENT OFFICE.

HENRY SKINNER, OF GRAVESEND, COUNTY OF KENT, ASSIGNOR OF ONE-HALF TO PHILIP FRANCIS ODDIE, OF MIDDLESEX COUNTY, ENGLAND.

BLOWER, PUMP, ENGINE, AND METER.

SPECIFICATION forming part of Letters Patent No. 423,497, dated March 18, 1890.

Application filed April 15, 1889. Serial No. 307,253. (No model.)

*To all whom it may concern:*

Be it known that I, HENRY SKINNER, engineer, a subject of the Queen of Great Britain, residing at 43 Singlewell Road, Gravesend, in the county of Kent, England, have invented certain new and useful Improvements in Blowers, Pumps, Engines, and Meters, of which the following is a specification.

My invention relates to rotary engines of that class in which a cylindrical outer casing, closed at each end and provided with inlet and outlet ports, has within and parallel with, but eccentric to it, a second cylinder and blades or flaps bridging the space between the casing and the cylinder, and which are hinged at one end to the inner cylinder, and at their opposite end are held always close to the inner circumference of the outer casing.

The objects of my invention are to prevent leakage and to avoid undue friction in engines of this kind. To attain these ends, I cause the outer ends of the blades or flaps to be held always close to the inner circumference of the outer casing by jointing their outer ends to pins which are parallel with the casing, and are at one end fixed to segments of a disk which are free to turn around a bearing pin or stud, which is concentric with the casing and is fixed to one of its ends. In this way the outer ends of the flaps are restrained from pressing forcibly against the outer casing, and the friction comes on surfaces near the axes of revolution of the parts, while at the same time I am able to employ a cylinder having no openings through its circumference through which leakage can take place.

Suitable inlet and outlet ports are formed in the casing, one on one side of the point of closest approximation of the inner cylinder and the other on the opposite side, their distance apart being such that the flaps always prevent the direct passage of fluid from one port to another. There is thus no necessity for the outer casing to be made to fit closely to the inner cylinder and to the flaps jointed to it at the point where the inner cylinder is nearest to it, and in this way, also, unnecessary friction is avoided. The inner cylinder I make to turn on a tubular bush, which extends inward from the center of the opposite end of the casing. The driving-shaft I make to pass through the tubular bush and couple its inner end to the inner cylinder, so that it may drive or be driven by it.

In the accompanying drawings, which represent so much of an apparatus embodying all my improvements as is necessary to illustrate the subject-matter herein claimed, Figures 1 and 2 are transverse sections showing the flaps in different positions; and Fig. 3 is a longitudinal section on the line A B, Fig. 1.

A cylindrical outer casing A is shown as provided with inlet and outlet ports C C'.

B is the inner cylinder, turning on a tubular bush E, which extends inward from one end of the outer casing.

F is a shaft passing through the tubular bush E. At its inner end it has a crank-wheel G upon it, from which a crank-pin projects into a hole formed in the end of the inner cylinder. (See Fig. 3.)

D D are three flaps jointed to the circumference of the inner cylinder.

J J are segments of a disk lying between the inner cylinder and one end of the outer cylindrical casing. These segments at their inner end are provided with laterally-projecting bearings, which rest on a bearing pin or stud K, that is fixed to the center of the end of the casing. The end of the casing is recessed to receive these bearings, so that a large bearing-surface may be given to them. The laterally-projecting bearings are made to abut against the ends of this recess, into which they also fit snugly, circumferentially, so that the segments are held against both circumferential and endwise play. The segments may also be recessed at the back, as shown, to admit fluid between them and the casing-head to counterbalance as nearly as may be the pressure upon their faces. The outer end of each flap is pivoted to its corresponding segment by means of a pin J', projecting laterally from its inner face into a hole in the flap.

A tight joint around the axis or driving-shaft F is maintained by a cup-washer L, Fig. 3, interposed between the end of the bush E and the face of the crank-wheel G. The flaps being jointed to the segments, the segments are caused to revolve around the stud K whenever the inner cylinder is revolved. The segments, however, do not revolve at a uniform speed, but alternately approach and recede from one another as they all revolve.

When the engine is used as a blower, the axis or shaft F should be driven in the direction shown by the arrow in Fig. 1. The pressure of the fluid then tends to turn the flaps inward toward the center, but they are held outwardly close to the casing by the segments. The inward thrust of the segments is thus borne by the central bearing pin or stud K, and the stud being of comparatively small diameter offers little friction to impede the rotation of the segments.

The operation of the apparatus will be readily understood from the foregoing description. The engine is shown as being made with three flaps, but it might be made with two or a greater number of flaps.

Having thus fully described the construction, organization, and operation of my improved engine, what I claim therein as new and of my own invention is—

1. The combination, substantially as hereinbefore set forth, of an outer casing provided with inlet and outlet ports, a cylinder inclosed therein and revolving on an axis eccentric thereto, a driving-shaft turning with this cylinder, segments of a disk free to revolve on an axis concentric with the outer casing, and flaps jointed at their inner ends to the cylinder and at their outer ends to the segments.

2. The combination, substantially as hereinbefore set forth, of an outer casing provided with inlet and outlet ports, a driving-shaft, a bush in which this shaft turns eccentrically to the axes of the casing, an inner cylinder revolving on this bush, a crank-wheel on the driving-shaft, a pin on the crank-wheel driving or driven by the cylinder, a shaft or bearing concentric with the outer casing, segments of a disk turning thereon, and flaps jointed at one end to the cylinder and at their opposite end to the segments.

3. The combination, substantially as hereinbefore set forth, of the casing, the bush, the cylinder turning thereon, the crank-wheel, the driving-pin, the washer between the crank-wheel and bush, the recessed head of the casing, the stud-axle or bearing thereon, the segments, their laterally-projecting bearings, and the flaps jointed to the cylinder and segments.

HENRY SKINNER.

Witnesses:
F. W. BARFF,
EDMUND G. MALLESON.